United States Patent

Hobbs

[11] 4,389,227
[45] Jun. 21, 1983

[54] GAS TURBINE ENGINE AIR INTAKE

[75] Inventor: John R. Hobbs, Amersham, England

[73] Assignee: Rolls-Royce Limited, London, England

[21] Appl. No.: 225,109

[22] Filed: Jan. 14, 1981

[30] Foreign Application Priority Data

Feb. 9, 1980 [GB] United Kingdom ................ 8004402

[51] Int. Cl.³ .............................................. B01D 39/00
[52] U.S. Cl. .................................. 55/306; 60/39.092; 55/463; 244/53 B
[58] Field of Search ...................... 55/306, 464, 463; 60/39.09 P; 244/53 B

[56] References Cited

U.S. PATENT DOCUMENTS

| | | | |
|---|---|---|---|
| 801,384 | 10/1905 | Koelkebeck | 55/464 |
| 3,148,043 | 9/1964 | Richardson et al. | 55/306 |
| 3,513,641 | 5/1970 | Hooper et al. | 55/306 |
| 3,616,616 | 11/1971 | Flatt . | |
| 3,684,857 | 8/1972 | Morley et al. . | |
| 3,977,811 | 8/1976 | Kuintzle | 55/306 |

Primary Examiner—Bernard Nozick

Attorney, Agent, or Firm—Cushman, Darby & Cushman

[57] ABSTRACT

An air intake structure for a gas turbine engine comprising a duct having an air inlet at its upstream end for the engine and a generally mushroom-shaped center body. The duct and the center body have circular cross-sections throughout their lengths and are coaxial. The center body has a first stem portion extending into the duct and a second mushroom-shaped portion upstream of the air inlet of the duct, the mushroom-shaped portion having a maximum diameter greater than the diameter of the air inlet. An apertured wall circumferentially extends around the maximum diameter of the second portion of the center body, the apertures of the wall being so dimensioned as to cause any small liquid droplets flowing over the upstream face thereof to coalesce into larger liquid droplets. A step immediately downstream of the apertured wall causes the formed larger droplets to be launched from the center body in a trajectory which avoids the air inlet of the duct. The apertures are dimensioned so that each launched liquid droplet is of a mass sufficient to provide the desired trajectory.

7 Claims, 3 Drawing Figures

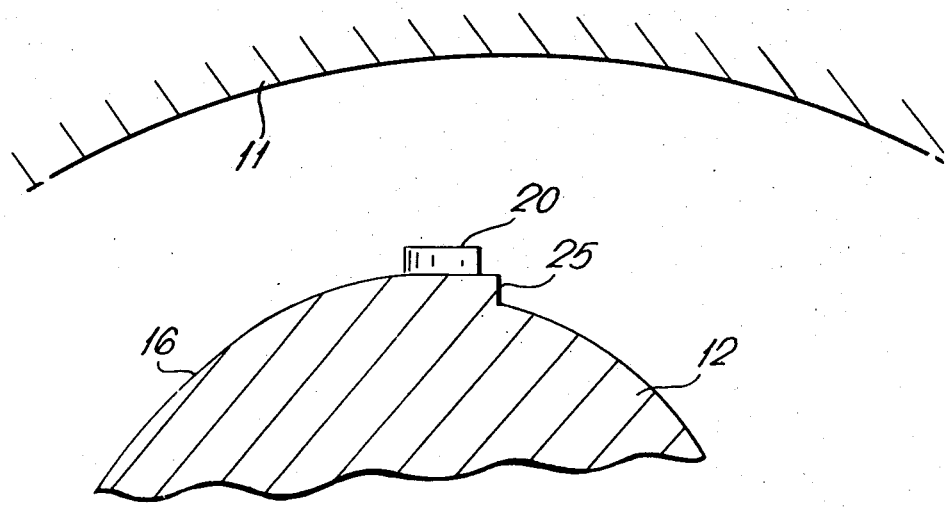

GAS TURBINE ENGINE AIR INTAKE

BACKGROUND OF THE INVENTION

This invention relates to gas turbine engine air intake structure.

Gas turbine engines adapted for use in powering helicopters are usually provided with air intakes which are adapted to separate particulate material from the air which eventually enters the engine. One common form of air intake adapted to achieve this end comprises a duct defining the engine air inlet and a centre body positioned upstream of the duct. The centre body has a convex dome-shaped upstream facing face which is of a larger diameter than engine air inlet. Thus air which eventually enters the engine air inlet must first follow a sinuous path around the centre body. The momentum of any particulate material carried by the air ensures that instead of following the same sinuous path as the air, it tends to be thrown clear of the engine air inlet.

If the air drawn in by the engine additionally carries water droplets, some will be thrown clear of the engine air inlet in the same way as the particular material. However, the remainder impacts the centre body and breaks up into a large number of smaller droplets which, as a result of surface tension forces, tend to adhere to the centre body and eventually flow into the engine air inlet. This is a highly undesirable phenomenum if the droplets are of sea water since their presence in the engine invariably results in accelerated rates of engine component corrosion.

DESCRIPTION OF THE INVENTION

It is an object of the present invention, therefore, to provide a gas turbine engine air intake structure with improved effectiveness in removing water droplets from engine intake air.

According to the present invention, a gas turbine engine air intake structure comprises a centre body and a duct defining an engine air inlet, both being of circular cross-section shape, at least a portion of said centre body being positioned upstream of and coaxial with said duct, said at least a portion of said centre body being of larger diameter than said duct and provided with means adapted in operation to coalesce any liquid impacting and subsequently flowing across the surface of said centre body into droplets and to launch said thus formed droplets from said centre body into the air stream passing in operation over said centre body, said liquid coalescing and launching means being adapted to coalesce said liquid into droplets of such a mass that each droplet, when launched, follows a trajectory avoiding said engine air inlet.

Throughout this specification, the terms "upstream" and "downstream" are used in relation to the air flow passing in operation through the gas turbine engine air intake in accordance with the present invention.

Said means adapted to coalesce said liquid into droplets and launch said coalesced liquid droplets preferably comprises a circumferential apertured piece extending radially outwardly of the largest diameter portion of said centre body and a circumferential stepped piece immediately downstream of said apertured piece, said apertured piece being adapted in operation to coalesce said liquid into droplets of the requisite mass and said stepped piece adapted in operation to launch said thus formed droplets from said centre body.

The apertures in said apertured piece preferably comprise a plurality of slits, each extending normally to the axis of said centre body.

Said apertured piece preferably comprises a plurality of equally spaced apart upstanding members, said slits being defined by adjacent members.

Said upstanding members may be so shaped that the upstream facing portions of adjacent members define converging paths to each of said slits.

Said duct defining said engine air inlet is preferably surrounded by a cowling so that together they define an annular engine bypass duct.

Said engine bypass duct is preferably so positioned that coalesced liquid droplets launched in operation from said centre body enter said engine bypass duct.

Said cowling preferably additionally surrounds said at least a portion of said centre body of greater diameter such that an annular air flow passage is defined between them.

BRIEF DESCRIPTION OF THE DRAWINGS

The invention will now be described, by way of example, with reference to the accompanying drawings in which

FIG. 3 is a view on line A—A of FIG. 2.

DETAILED DESCRIPTION OF THE INVENTION

Figure 1:
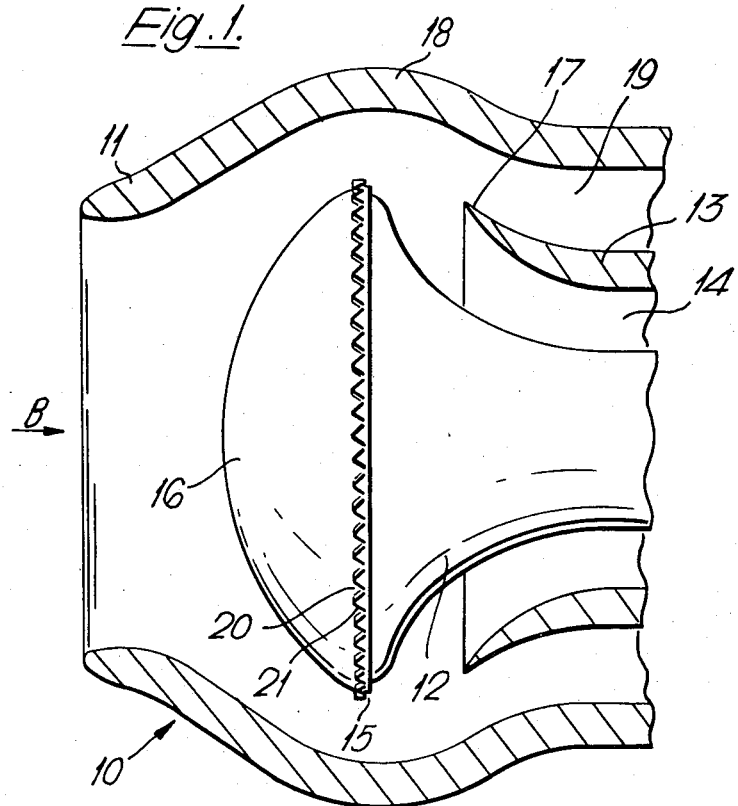
FIG. 1 is a partially sectioned side view of a gas turbine engine air intake structure in accordance with the present invention.

With reference to FIG. 1 a gas turbine engine air intake structure generally indicated at 10 consists of an outer cowling 11 enclosing a centre body 12 and a duct 13 which defines the engine air inlet 14. The cowling 11, centre body 12 and duct 13 are all of circular cross-sectional shape.

The centre body 12 is located coaxially within the duct 13 and its diameter progressively increases as it emerges from the duct 13 in the direction right to left (when view in FIG. 1) until it reaches a maximum value at 15, where its diameter is greater than that of the duct 13. Its diameter then progressively decreases to define a generally convex, dome shaped face 16. The lip 17 of the duct 13 is outwardly flared to accomodate the diverging shape of the centre body 12.

The cowling 11 is provided with an enlarged diameter region 18 to accomodate the maximum diameter portion 15 of the centre body 12. Thus in operation, air entering the cowling 11 in the direction indicated by the arrow B must first follow a sinuous path around the centre body 12 before entering the engine air inlet 14. As the air passes the largest diameter portion 15 of the centre body 12, it flows radially inwards as it is drawn into the engine air inlet 14. The momentum of any particulate material carried by the air tends to cause those particles to deviate from the air flow path and follow a trajectory which avoids the engine air inlet 14. The trajectory of the particulate material in fact carries it into a bypass duct 19 which is defined between the cowling 11 and the duct 13. The bypass duct 19 extends the length of the gas turbine engine (not shown) before exhausting into the engine exhaust efflux. Thus any particulate material carried by the air entering the cowling 11 is separated from that air flow and subsequently passed into the engine exhaust efflux.

If the air entering the cowling 11 carries water droplets, then some of those droplets will impact the face 16 of the centre body 12 and break up into a large number of smaller droplets. As a result of surface tension forces, those smaller droplets tend to adhere to the face 16 and flow towards the greatest diameter portion 15 of the centre body 12. However at 15 they encounter a radially extending wall 20 made up of a plurality of equally spaced apart upstanding members 21.

Figure 2:
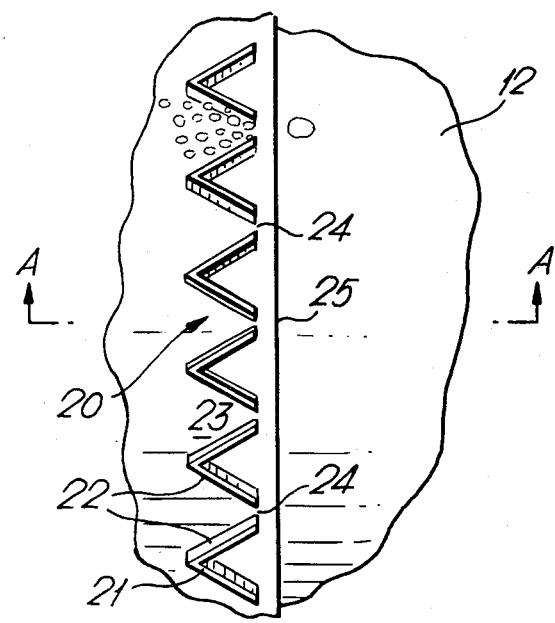
FIG. 2 is an enlarged view of part of the centre body of the gas turbine engine air intake structure shown in FIG. 1.

The wall members 21, which can be more easily seen in FIG. 2, are each of generally V-shaped cross-sectioned form with the apex of each V facing upstream. They are spaced around the centre body 12 so that their upstream faces 22 define converging paths 23 for the water droplet flow from the centre body face 16. The wall members 21 are spaced apart to such an extent that slits 24 are defined by adjacent wall members 21, one slit 24 being at the convergence of each path 23. The converging paths 23 and slits 24 cooperate to coalesce the small water droplets into larger droplets which subsequently emerge from the slits 24 in a downstream direction as can been seen in FIG. 2.

In order to encourage the thus formed larger droplets to enter the air stream passing over the centre body 12, a circumferential step 25 is provided in centre body 12 immediately downstream of the wall 20 (FIG. 3). The step 25 serves to launch the larger droplets from the centre body 12 into the air stream. The slits 24 are so dimensioned that the larger droplets are of such a mass that when launched from the centre body 12, they follow a trajectory similar to that of the particulate material which carries them into the bypass duct 19, thereby avoiding the engine air inlet 14.

Although the present invention has been described with reference to a slitted structure it will be appreciated that other apertured structures could be utilised in the coalescing of the water droplets. Moreover means other than a step could be employed in launching the larger, coalesced droplets from the centre body 12.

I claim:

1. An air intake structure for a gas turbine engine comprising:

a duct having an upstream air inlet for the gas turbine engine, said duct being of circular cross-section;

a center body being circular in cross-section and coaxial with said duct, said center body having a first stem portion extending from within said duct through said air intake and a mushroom-shaped second portion positioned upstream of said air inlet of said duct, said second portion having an upstream facing surface against which liquid impacts and flows across, and said second portion having a maximum diameter greater than a diameter of said air inlet, said maximum diameter of said second portion being spaced upstream from said air inlet;

liquid coalescing means provided on said second portion at said maximum diameter, said liquid coalescing means being arranged to coalesce any liquid impacting and subsequently flowing across said upstream facing surface into large liquid droplets; and liquid droplet launching means positioned immediately downstream of said liquid coalescing means and upstream of said air inlet means for launching the formed liquid droplets into the air stream passing over said center body, said liquid coalescing means being arranged to form the liquid droplets into a mass, when the same are launched by said liquid droplet launching means, to follow an outward and downstream trajectory sufficient to avoid the air inlet of said duct.

2. A gas turbine engine air intake as claimed in claim 1 wherein said liquid coalescing means comprises an annular array of upstanding members extending radially outwardly of the maximum diameter of said second portion of said center body, said upstanding members being circumferentially spaced apart so as to define slits therebetween, said upstanding members being shaped to define converging paths to each of said slits, and said liquid droplet launching means comprises a circumferential stepped piece positioned on said center body immediately downstream of said annular array of upstanding members, said annular array of upstanding members being adapted in operation to coalesce said liquid into droplets of the requisite mass and said stepped piece adapted in operation to launch said thus formed droplets from said center body.

3. A gas turbine engine air intake as claimed in claim 1 wherein said liquid coalescing means comprises a plurality of upstanding members, said members being equally spaced apart to define slits for discharging the droplets to said liquid droplet launching means.

4. A gas turbine engine air intake as claimed in claim 3 wherein said upstanding members are so shaped as to define converging paths to each of said slits.

5. A gas turbine engine air intake as claimed in claim 1 including a cowling surrounding and spaced from said duct and defining therewith an annular engine bypass duct.

6. A gas turbine engine air intake as claimed in claim 5 wherein said engine bypass duct is positioned to receive coalesced liquid droplets launched from said liquid droplet launching means.

7. A gas turbine engine air intake as claimed in claim 5 wherein said cowling additionally surrounds the maximum diameter of said second portion of said centre body to define therewith an annular air flow passage.

* * * * *